(12) United States Patent
Hahn-Carlson

(10) Patent No.: US 7,110,959 B2
(45) Date of Patent: Sep. 19, 2006

(54) PROCESSING AND MANAGEMENT OF TRANSACTION TIMING CHARACTERISTICS

(76) Inventor: Dean W. Hahn-Carlson, 1423 Highland Pkwy., St. Paul, MN (US) 55116

( * ) Notice: Subject to any disclaimer, the term of this patent is extended or adjusted under 35 U.S.C. 154(b) by 360 days.

(21) Appl. No.: 10/729,350

(22) Filed: Dec. 5, 2003

(65) Prior Publication Data

US 2004/0138937 A1 Jul. 15, 2004

Related U.S. Application Data

(63) Continuation-in-part of application No. 09/527,717, filed on Mar. 17, 2000, which is a continuation-in-part of application No. 09/522,745, filed on Mar. 10, 2000, now Pat. No. 6,697,702, which is a continuation-in-part of application No. 08/748,243, filed on Nov. 12, 1996, now Pat. No. 5,910,896.

(60) Provisional application No. 60/431,659, filed on Dec. 6, 2002.

(51) Int. Cl.
G06F 15/24 (2006.01)
G06F 15/21 (2006.01)

(52) U.S. Cl. ............... 705/8; 705/26; 705/28; 705/39; 705/40; 705/42; 705/44; 364/401; 364/403; 364/406

(58) Field of Classification Search ............... 705/8, 705/26, 28, 39, 40, 42, 44
See application file for complete search history.

(56) References Cited

U.S. PATENT DOCUMENTS

| 4,114,027 | A | | 9/1978 | Slater et al. |
|---|---|---|---|---|
| 4,270,042 | A | | 5/1981 | Case |
| 4,305,059 | A | | 12/1981 | Benton |
| 4,412,287 | A | | 10/1983 | Braddock, III |
| 4,567,359 | A | | 1/1986 | Lockwood |
| 4,713,761 | A | | 12/1987 | Sharpe et al. |
| 4,725,719 | A | | 2/1988 | Oncken et al. |
| 4,750,119 | A | | 6/1988 | Cohen et al. |
| 4,799,156 | A | * | 1/1989 | Shavit et al. ............ 705/26 |
| 4,926,325 | A | | 5/1990 | Benton et al. |
| 4,949,272 | A | | 8/1990 | Vanourek et al. |
| 4,960,981 | A | | 10/1990 | Benton et al. |

(Continued)

FOREIGN PATENT DOCUMENTS

FR 2543327 * 9/1984

OTHER PUBLICATIONS

JIT systems and external logistics suppliers–Spencer, Michael S. Rogers, Dale S Daugherty, Patricia J.—International Journal o Operations & Productuiin Management, v14n6, pp. 60–74, 1994 (includes Chart appendix References).*

*Primary Examiner*—James P. Trammell
*Assistant Examiner*—Daniel L. Greene

(57) ABSTRACT

A transaction management and processing approach involves using timing-related aspects of transaction events to manage and process transaction-type information. According to an example embodiment of the present invention, a transaction management approach involves using a transaction processor arrangement to track transaction events with or as a function of timing characteristics. In one implementation, the timing between related transaction events for a particular transaction is tracked such that parties to the transaction can identify and monitor the timing. In another implementation, the timing between pickup and delivery events for a shipping transaction is identified and processed for use by parties to the transaction. With these and other approaches, the management, monitoring and processing of transactions is facilitated.

18 Claims, 5 Drawing Sheets

U.S. PATENT DOCUMENTS

| | | |
|---|---|---|
| 5,008,827 A | 4/1991 | Sansone et al. |
| 5,025,372 A | 6/1991 | Burton et al. |
| 5,040,132 A | 8/1991 | Schuricht et al. |
| 5,043,908 A | 8/1991 | Manduley et al. |
| 5,077,694 A | 12/1991 | Sansone et al. |
| 5,117,364 A | 5/1992 | Barns-Slavin et al. |
| 5,153,842 A | 10/1992 | Dlugos, Sr. et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A * | 6/1993 | Sharpe et al. ............... 705/30 |
| 5,231,569 A | 7/1993 | Myatt et al. |
| 5,285,383 A | 2/1994 | Lindsey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,485,369 A | 1/1996 | Nicholls et al. |
| 5,631,821 A | 5/1997 | Muso |
| 5,677,955 A | 10/1997 | Doggett et al. |
| 5,694,551 A | 12/1997 | Doyle et al. |
| 5,717,989 A | 2/1998 | Tozzoli et al. |
| 5,806,063 A | 9/1998 | Dickens |
| 5,893,080 A | 4/1999 | McGurl et al. |
| 5,910,896 A | 6/1999 | Hahn-Carlson |
| 5,924,082 A | 7/1999 | Silverman et al. |
| 5,960,407 A | 9/1999 | Vivona |
| 6,021,202 A | 2/2000 | Anderson et al. |
| 6,055,519 A | 4/2000 | Kennedy et al. |
| 6,131,087 A | 10/2000 | Luke et al. |
| 6,151,588 A | 11/2000 | Tozzoli et al. |
| 6,209,095 B1 | 3/2001 | Anderson et al. |
| 6,223,168 B1 | 4/2001 | McGurl et al. |
| 6,526,443 B1 | 2/2003 | Goldsmith et al. |
| 6,571,149 B1 | 5/2003 | Hahn-Carlson |
| 2002/0072956 A1 | 6/2002 | Williams et al. |
| 2002/0107794 A1 | 8/2002 | Furphy et al. |
| 2002/0161719 A1 | 10/2002 | Manning et al. |
| 2002/0184527 A1 | 12/2002 | Chun et al. |
| 2003/0158811 A1 | 8/2003 | Sanders et al. |

\* cited by examiner

PROCESSING AND MANAGEMENT OF TRANSACTION TIMING CHARACTERISTICS

RELATED PATENT DOCUMENTS

This is a continuation-in-part of U.S. Provisional Patent Application Ser. No. 60/431,659 filed on Dec. 6, 2002 and entitled "Tracking and Reporting Freight Shipment Timing," to which priority is claimed under 35 U.S.C. §120 for common subject matter.

This is also a continuation-in-part of U.S. patent application Ser. No. 09/527,717 filed on Mar. 17, 2000, which is a continuation-in-part of U.S. patent application Ser. No. 09/522,745, now U.S. Pat. No. 6,697,702 converted from U.S. Provisional Patent Application Ser. No. 60/124,124 filed Mar. 12, 1999, which is a continuation-in-part of U.S. patent application Ser. No. 08/748,243 filed Nov. 12, 1996 and now U.S. Pat. No. 5,910,896, all of which are incorporated herein by reference.

FIELD OF THE INVENTION

The present invention is directed to business interactions and, more specifically, to the processing and management of shipment transactions between two or more parties.

BACKGROUND OF THE INVENTION

Processing business transactions between two or more parties has been a manually intensive effort and has experienced little change. Simple transactions often involve multiple parties to the transaction, multiple types of documents (electronic and/or physical documents) and multiple identification approaches for information pertaining to the documents. In general, information regarding these transactions, whether in documents or otherwise, is often difficult to obtain and not readily available to certain parties to the transaction.

One type of business transaction that has required significant tracking and processing effort involves the shipment of goods between parties to the transaction. Generally, the shipment transaction process involves a goods transport path and a payment process path. The goods transport path typically starts when a carrier's driver picks up the goods at the shipper's warehouse dock. The driver typically receives a copy of a transaction document, sometimes referred to as a bill of lading (BOL), from the shipper. This type of transaction document includes information associated with the shipment transaction, such as the time that the shipment is initiated, that is used by the shipper and carrier to track the shipment of goods. The driver transports the goods to a receiver where the receiver acknowledges receipt of the goods by, for example, signing a copy of a BOL. After the driver has delivered the goods to the receiver, the driver also submits the receiver's acknowledgment (e.g., a signed copy of the BOL or electronic representation of the acknowledgment) to a central location for the carrier. This acknowledgment often includes data related to the shipment such as delivery time. However, the submission of the receiver's acknowledgment can be delayed, for example, until such a time when the driver delivering the shipment can provide the acknowledgment (and other information) to the central location.

During various points in the shipment transaction process, it is often desirable to generate records that contain information about pick-up and delivery times, origin and destination, and type of load. These records are sometimes difficult to generate. In particular, tracking shipment timing and generating records therefor can be challenging. For instance, if a shipment is not ready or there are delays at the loading dock when a driver arrives to pick up the shipment, the time for executing the shipment is increased. Often, carriers may wish to impose charges for delays at the place of shipment. Because the carrier is typically not part of the original transaction documents (e.g., a BOL), the shipper may dispute charges, which can cause payment delays. Back at the loading dock, a second problem is created when manual changes are made on the BOL. Unfortunately, these changes rarely get recorded in the shipper's permanent electronic records, thus causing a difference between the shipper's and the carrier's paperwork for the same shipment. Without accurate tracking of timing and other shipping-related characteristics, parties to the transaction are often without sufficient information upon which to base transaction processing decisions or for which to use in monitoring performance.

When a BOL is used for the shipment and the original and delivery copies of the BOL reach the carrier's central location, information from the BOL is made available to the carrier. For instance, the carrier can identify shipment acceptance and timing information from the BOL and use the information to generate an invoice for the original shipment, which is sent to the party responsible for payment of the shipping and/or other parties to the transaction. The responsible party (e.g., the shipper) typically receives the invoice amid a multitude of invoices for many carriers and attempts to match the invoice with a copy of the original BOL. If a billing error is discovered, the responsible party might send a check for a partial payment or simply hold the entire payment until the corrected invoice is provided. The carrier receives this check and must then track down the original BOL and delivery copy to know why the check is for less than the total amount due. It is only after communicating with the shipper directly that the carrier finds out a mistake was made in the original paperwork. The carrier sends the shipper an amendment to the original invoice, and the shipper must then organize and file all the paperwork together.

The payment process path starts when the driver picks up the goods from the shipper. The driver sends a copy of the BOL (or equivalent) to the carrier's central location for processing and the carrier rates the BOL. Rating typically involves determining the shipment cost that takes into the account various shipment parameters such as the size, weight, type of material, and destination of the shipment, which is related to the time it will take the driver to make the delivery. The carrier creates an invoice, sets up an accounts receivable, and sends the invoice to the shipper's accounts payable department. The shipper, either internally or via a third party, audits the invoice to ensure the final cost is proper.

One of the more challenging aspects of the traditional transaction process involves reaching agreement as to the final cost. If there is a dispute as to final cost, the shipper and carrier begin a burdensome and sometimes lengthy negotiation process in an attempt to settle the dispute. If the dispute is resolved, the shipper sets up an accounts payable for the transaction. The shipper will then send payment to the carrier and clear the accounts payable. The traditional process for paying the carrier and clearing the accounts payable involves several manually intensive steps. Upon receipt of payment, the carrier clears the accounts receivable. The traditional process for clearing an accounts receivable includes the carrier manually inputting final payment information into the accounts receivable system.

Another challenge to the traditional transaction process involves the difficulty in tracking and obtaining information about the shipment transaction. This information is often related to the final cost. For instance, if a shipper causes a delay at the shipping dock and the carrier incurs expenses relating to the delay, it is sometimes difficult to account for this delay. In addition, certain parts of the tracking information is not readily available to all parties to a transaction. For instance, a carrier will typically have the information it needs from a BOL, but a shipper may not have access to the same information (e.g., the shipper may not know of the time of delivery).

As discussed above, the traditional approach to transaction management can lead to many challenges for a transaction between one shipper and one carrier. Typically, however, there are multiple carriers and shippers involved in multiple transactions, as well as other parties to a transaction between a shipper and carrier, which makes the situation more complex and correspondingly slow and inefficient. The transaction process is manually intensive in that it relies on transaction documents (such as a hard copy of a BOL) for proof of delivery and payment, resulting in a series of repetitive and time consuming steps. Also, in the instance of BOL documents, each BOL is often rated multiple times by multiple parties creating excessive redundancy.

Traditional shipment transaction systems are also highly susceptible to billing errors and fraud. For example, there is often no connection between the delivery of goods and the billing of the shipper for delivery. This may result in double billing, no billing at all, or over-billing for freight delivery charges. Also, an auditing error may occur which results in incorrect billing or payment. In addition, the carrier waits a disproportionately long time for payment while the invoice is being audited and/or disputed. For example, traditionally, a delivery takes about five days whereas payment takes about thirty days. This unnecessary delay adversely affects the carrier's working capital resources.

Additional costs arise as a result of the existing inefficiencies. Many of the costs are individually small, but very large in the aggregate. For example, the carrier incurs administrative costs including: the cost to create and deliver the initial invoice, costs of resolving billing disputes, costs of providing a signed copy of the BOL to the shipper, costs related to timing delays of the shipment and costs of posting accounts receivable. The shipper incurs similar administrative costs.

Another disadvantage of traditional shipment transaction systems is that they have a tendency to strain relationships. Because carriers and shippers do not always have an effective way to communicate about the shipment, business partnerships can be strained when there are disputes. For instance, it is sometimes difficult for a shipper to obtain information that can be used to evaluate the carrier's performance for a particular transaction or over a multitude of transactions, with the shipper and/or with other shippers. In addition, inaccuracies in either the shipment or invoice process create unnecessary tension along the entire supply chain for both shippers and carriers.

An additional disadvantage of traditional shipment transaction systems involves the inability to obtain immediate information regarding a shipment. Since the process is largely conducted manually, it is very difficult to track a shipment. To learn of the status of shipment or payment, there are various manual steps involved. For example, if the shipper wants to know if the carrier delivered the goods and if the payment has been made, the shipper must call the carrier and the appropriate financial institution. As another example, if the shipper wants to know how long it took the carrier to deliver the goods, it may need to contact the receiver or the carrier to obtain that information, which is often not readily available.

In some instances, carriers have offered Internet access to their shipment information. Shippers can access transaction information via the Internet to determine, for example, the status of a shipment. However, when a shipper is using multiple carriers, multiple accesses may need to be made in order to obtain information about different transactions. In addition, multiple shipments with a single carrier often require that the shipper access each shipment transaction separately. These approaches are unduly time consuming.

Still another challenge to the transaction process is related to the disparate reference and tracking numbers used by different parties to a transaction. For instance, a shipper's reference number is typically not compatible to a carrier's reference number for the same transaction. The carrier typically maintains the shipment data, so the shipper must use the carrier's reference number in order to access the data.

The above and other difficulties have been challenging to the management and tracking of business transactions, and particularly to shipping transactions.

SUMMARY OF THE INVENTION

The present invention is directed to overcoming the above-mentioned challenges and others that are related to the types of approaches and implementations discussed above and in other applications. The present invention is exemplified in a number of implementations and applications, some of which are summarized below.

According to an example embodiment of the present invention, transaction-related timing characteristics are used in the auditing of a particular transaction. Data regarding transaction events is stored and used together with the receipt of information regarding specified events to store data indicative of an elapsed time for the transaction events. The stored transaction event data and elapsed time data are used to provide information that corresponds to the status of the transaction. With this approach, timing characteristics of business transactions can automatically be used to evaluate or otherwise audit characteristics of a transaction, facilitating the transaction process including completion and payment thereof.

In another example embodiment of the present invention, a transaction auditing system for a business transaction involving at least two remotely-situated parties includes a central processing arrangement adapted to use transaction event data to audit transactions. Aspects of the business transaction including specified events that would occur at different times are stored, with information indicative of a status of the transaction being provided. Confirmation of at least two of the specified events is received from different remotely-situated parties and data indicative of the time elapsed between the specified events is recorded. The central processing arrangement uses the stored aspects and the recorded data to provide information corresponding to the status of a business transaction between the at least two parties.

According to another example embodiment of the present invention, a transaction auditing system for a business transaction includes a data storage arrangement and a central processing arrangement for auditing transactions. The data storage arrangement stores user profile information including party-identifying information for parties to a business transaction as well as aspects of business transactions including specified events that would occur at different times. This and other stored information provides information indicative of a status of the transaction.

The central processing arrangement is coupled to the data storage arrangement and is adapted to receive event data for specified events from remotely-situated parties. The event data includes a timing-related characteristic and information for associating the specified event with a common business transaction. The central processing arrangement further automatically associates the received event data for the specified events with a particular common business transaction and with at least one of the parties as a function of the confirmation data and the user profile information. Using the received confirmation data, the central processing arrangement determines an elapsed time between the specified events and automatically audits the particular common transaction as a function of the elapsed time.

In another example embodiment of the present invention, a transaction system is adapted for operating in an environment of multiple parties to a transaction to process transaction information related to a transaction between the parties. The transaction system includes a terminal adapted to accept transaction information at a first party's premises and to generate a set of common transaction information in response to the accepted transaction information. The set of common transaction information includes a code to identify a second party to the transaction, a code to identify the first party to the transaction, information associated with the transaction and the time at which the transaction is initiated. A central transaction processor stores authorized profile list criterion including information about authorized users and determines whether the accepted transaction information satisfies the authorized profile list criterion. Another terminal informs the central transaction processor of satisfaction of the transaction with data including a transaction completion date and time by the second party. The central transaction processor uses the set of common transaction information and the authorized profile list criterion to audit the transaction and payment thereof.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
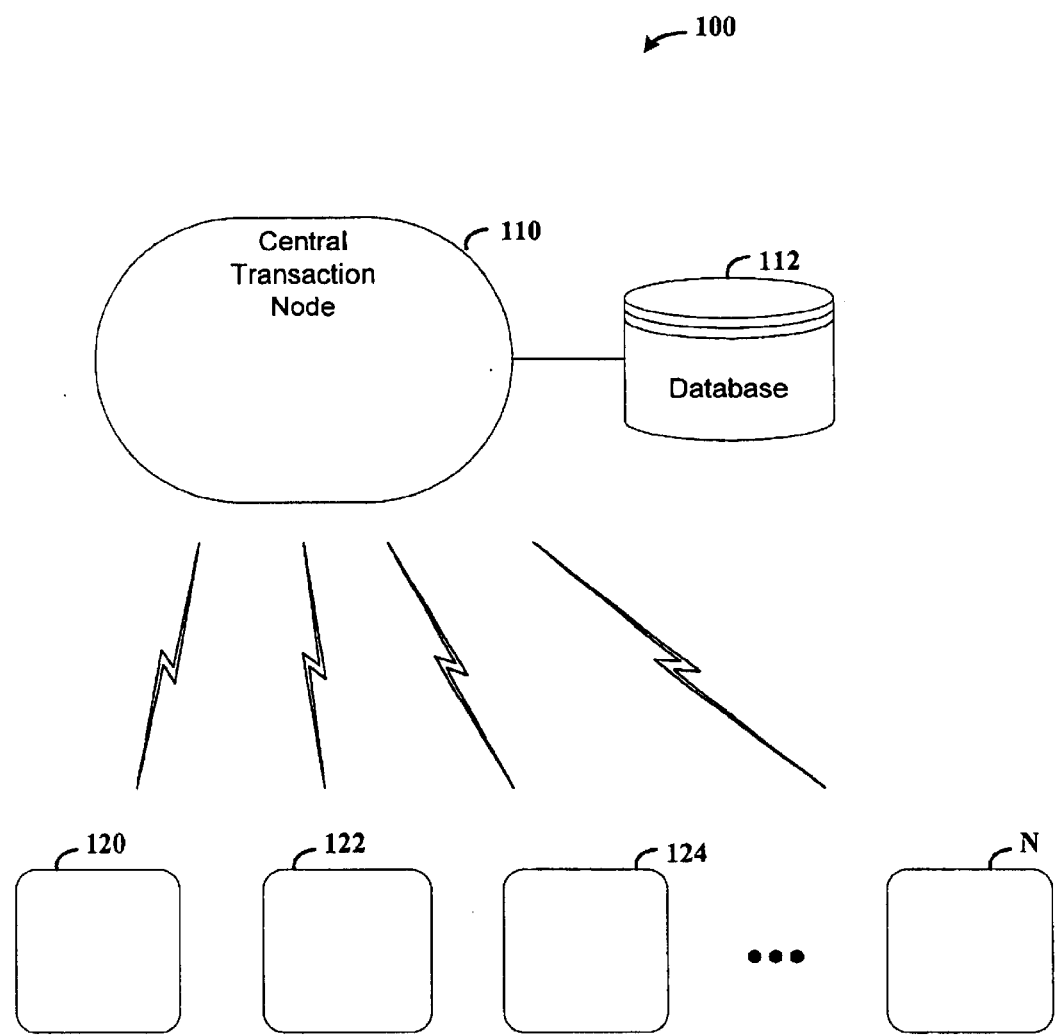
FIG. 1 is a block diagram showing a central transaction node adapted for interacting with a plurality of transaction parties and for processing and managing timing-related characteristics of transactions therewith, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of business approaches and interactions, and has been found to be particularly useful for applications involving the processing of business transactions and timing-related aspects thereof. While the present invention is not necessarily limited to such approaches, various aspects of the invention may be appreciated through a discussion of various examples using these and other contexts.

According to an example embodiment of the present invention, a business transaction is processed and managed using an approach that facilitates the tracking of timing-related characteristics for transaction events. A transaction processor is adapted to process information relating to a transaction event in order to identify timing characteristics of the transaction event. The identified timing characteristics are used in connection with profile characteristics of parties to the transaction (and to which the transaction event relates) to generate an output that relates the timing characteristics to parties to the transaction. With this approach, a multitude of transaction-processing timing information is made available and can be used for a variety of purposes.

In one implementation, the profile characteristics for each party include identification and preference information for the party. The transaction processor uses the party identification information when receiving information indicative of a transaction event in order to determine which parties are associated with the transaction event. For example, when a transaction event such as a payment, invoicing, shipping and/or receiving event is recorded, information for the recorded event includes identification for at least one of the involved parties. The transaction processor uses the party identification to determine which party or parties relate to the transaction event.

In another implementation wherein the profile characteristics for each party include identification and preference information for the party, the transaction processor is further adapted to correlate transactions with party identifications using, for example, stored correlation information. For instance, when the transaction processor is programmed with data including an order number for a transaction, parties to the transaction can be linked as a function of the order number. When a transaction event includes transaction-identifying information (e.g., an order number), the transaction processor uses the link between the transaction-identifying information and the parties to the transaction to determine profile characteristics to use in processing the transaction event. With this approach, the information for the transaction event does not necessarily need to include party-identifying information. For example, when a transaction event such as a payment, invoicing, shipping and/or receiving event is recorded, information for the recorded event may simply include transaction-identifying information such as an order number. The transaction processor then uses the transaction-identifying information to determine which parties are related to the transaction event.

Once the involved parties are identified, timing characteristics of the transaction event as indicated by the information recorded therewith are processed in accordance with one or more of the parties' preference information. For instance, where a particular party to a transaction wishes to be notified of a transaction event and indicates so in that party's preference information, the receipt of event information at the transaction processor is followed by notification of the event to the party. Depending up on the preference(s) of the parties to the particular transaction, other processing functions involving the transaction event and timing characteristics thereof are also carried out at the transaction processor.

Where two related transaction events having timing characteristics are reported, the transaction processor can further be implemented for calculating the time between the events and reporting that time to a party to the transaction. For instance, when a transaction event is recorded, information regarding the transaction event that is sufficient to identify at least one party to the transaction event and the time of the event is generated and made available (i.e., sent) to a transaction processor. When another transaction event is recorded, similar information regarding the transaction event is also made available to the transaction processor.

Using the party identification and timing information from each transaction event together with profile characteristic information for at least one of the parties, the transaction processor identifies a relationship between the transaction events. For instance, when profile information for one (or both) parties indicates that the two transaction events are related (e.g., both transaction events reference a common order number), the transaction processor identifies this relationship. The timing information for each transaction event is compared and a relative time between the transaction events is calculated. The calculated time can be stored at the transaction processor, at a database accessible by the transaction processor and/or sent immediately to one or more parties to the transaction.

The calculated relative time between transaction events is then available for a variety of processing purposes, as directed by the profile information or otherwise. For instance, where one of the parties to the transaction is interested in tracking the timing between two events (with this interest being reflected in that party's profile information), the transaction processor notifies the party of the calculated relative time. This approach is applicable to the tracking of timing between a multitude of transaction events, such as between an invoice issuance event and payment event therefor, between a credit approval event and an associated payment event or between the initiation of a shipping event and a delivery event therefor.

The transaction events to which various ones of the example embodiments and implementations discussed herein can be tracked for separate entities and/or a single entity, with the transaction events being internal to a particular organization. For example, transaction events between business entities such as the sale of goods and the corresponding shipping, payment and reconciliation events related to the sale of goods can be tracked using this approach. In the instance where reconciliation of a transaction dispute is effected, the time from the reconciliation event can be tracked in connection with the timing of a payment event, thus giving the elapsed time from reconciliation to payment. Tracking elapsed reconciliation/payment time can be useful, for example, in providing customers with information from which to compare funds transfer speed and accordingly track business expenses. Example internal transaction events that can be tracked include similar events for transactions between separate divisions or locations within an entity, such as the shipping of a replacement part from a storage warehouse to the location at which the replacement part is to be implemented.

In addition, transactions often involve both internal and external events and as such, the transaction processor can be implemented for tracking both. For example, when a buyer orders an item from a seller, the seller often has to pull the item from a warehouse stocking location and transport that item to a location where it can be shipped to the buyer (e.g., a shipping dock). When more than one item is ordered, each item may not necessarily be in a similar location. In this instance, all of the ordered items may first have to be transported to a packing location, where the items are packed and subsequently transported to a shipping dock for shipment as a unit to the buyer. These and other transaction events (and the corresponding timing therebetween) are readily tracked by the transaction processor, and with the ability to track both internal and external events, integrated with larger-scale timing characteristics involving a multitude of transaction events.

In another implementation, the transaction processor is programmed to grant selective access to data storage characteristics related thereto. The selective access may involve a password or other security measure to limit access to a particular data storage location. For instance, where a timing-related characteristic for a particular transaction is identified and stored at a database used by the transaction processor, access to the stored data by parties to the transaction is selectively provided as a function of a security authorization level associated with the party attempting access. In this regard, access to such information may be selectively limited to parties to the transaction event or to the transaction to which the event applies. Authorization may simply mean that the party attempting access must be an identified party to the transaction, or involve more complex security measures such as password or encryption type measures. This ability to selectively limit access to the information is particularly useful where a transaction includes multiple parties, for example as with a buyer, seller and carrier; the shipment of goods may be the responsibility of the seller and carrier, but the buyer may be granted access to the information. This ability to access the information may be helpful to facilitate the buyer's ability to understand when a shipment may arrive. From the seller's perspective, the ability to access the timing information of the shipment is useful for evaluating both its internal ability to provide goods in a timely manner and also to evaluate the carrier's ability to make a delivery in a timely manner. From the carrier's perspective, it can track its own performance in delivering goods, and also track the performance of individuals involved in the physical shipping of the goods such as a trucker.

According to another example embodiment, the above-discussed approaches to the tracking of timing-related characteristics for a particular transaction are used for wide scale tracking of timing performance for a plurality of business entities, with access to the timing performance being controlled by the transaction processor. For example, when parties involved in the shipment of goods need to evaluate the performance of different carriers in order to select a carrier, the tracked timing information for each carrier can be used to make the evaluation. In this regard, shippers having access to transaction timing information via the transaction processor can generate reports for use in comparing the delivery performance of carriers. These reports may include (or be cross-referenced with) shipping costs for each carrier, such that a selection of a particular carrier for a transaction can be made as a function of both performance and cost.

In another implementation, access to information used by the transaction processor in processing transaction event information is also selectively provided to parties to the transaction. This information to which access is permitted may include, for example, profile information for parties to a transaction. In some instances, access to the information is also accompanied with the ability to make changes to the profile information, such changes being implemented for controlling the manner in which the transaction processor manipulates or otherwise processes transaction event data. For example, when a particular party to a transaction wishes to be automatically informed of a the timing of a shipping transaction event (e.g., receipt of goods), that party can set its profile information so that the transaction processor will automatically notify the party of such a shipping transaction event. In the example instance where the shipment of goods is involved, when a shipping transaction event identifying the party is received by the transaction processor, the transaction processor uses the set profile information to determine that timing characteristics of the shipping transaction event should be reported to the party. Additional instructions for processing the timing characteristics can similarly be set by users by modifying profile information used by the transaction processor.

Turning now to the figures, FIG. 1 shows a system 100 implemented with a transaction management approach for a multitude of users (parties to transactions), according to another example embodiment of the present invention. A central transaction node 110 is adapted to communicate with a multitude of users, represented by blocks 120, 122 and 124 through block N. The communication between the central transaction node 110 and one or more of these users is effected via one or more types of communications media such as electronic media (i.e., wired and/or wireless) or physical media (e.g., mail or other paper documents). The system 100 also includes a database 112 adapted to store information for use by the central transaction node, for use in general operation thereof as well as for use in storing information such as transaction and profile information relative to the users 120-N. The database 112 is also adapted to store expected timing event aspects for transactions such as event aspects related to shipment and receipt of goods.

One or more of the approaches discussed above to transaction management can be readily implemented with the system 100. In one implementation, each of the users 120-N store user profile information at the database 112 for use in managing and/or processing transaction information. Access to the database 112 is controlled by the central transaction node 110 for both storing user profile information, editing the information and viewing other transaction related information, including information proprietary to other users. When the central transaction node 110 receives transaction information, it uses the stored user profile information and/or other programming at the database 112 for processing the transaction information.

The management of transactions is controlled in a variety of manners by the central transaction node 110, depending upon the parties (users) involved in the transaction as well as specific characteristics of the transaction. For instance, when a transaction event occurring at user block 120 is reported to the central transaction node 110, the central transaction node uses the transaction information as well as the source of the information to determine a manner in which to process the transaction event. The central transaction node 110 may identify the sending user 120 using, for example, a code or other indicator in data communicated to the central transaction node by the user 120 in connection with the transaction information, with the indicator being embedded in the transaction information. This indicator can also be used for controlling security access to the central transaction node 110 and the database 112.

In one implementation, the transaction event is processed at the central transaction node 110 using timing-characteristics of the transaction event communicated from the user 120. For purposes of this implementation, user 120 is a shipper (e.g., seller), user 122 is a carrier and user 124 is a receiver (e.g., buyer). Information for a transaction event involving the initiation of transportation of goods from the shipper 120 to receiver 122 via carrier 124 is sent to the central transaction node 110 by the shipper. The information includes timing information for the shipping initialization as well as other information that the central transaction node 110 can use to associate the timing information with a particular transaction. This transaction association information may include a transaction-identifier, party-identifier or other information that allows the central transaction node 110 to perform the association, and may involve the use of data stored at the database 112. This association may, accordingly, be carried out using one or more of the association approaches discussed above in connection with other example embodiments (e.g., using user profile information or transaction identifying information such as an order number).

When the central transaction node 110 receives the information from the shipper, it uses shipper-identifying information and the timing information to correlate the information to a particular transaction. The transaction event is then processed in accordance with business rules associated with the parties to the particular transaction. In addition, wherein specified timing events are stored at the database 112, the receipt of timing information can be associated with the specified timing events. Furthermore, the status of a particular transaction can be determined as a function of the received timing information, with the status being optionally stored in the database 112. For instance, when information regarding a transaction event involving the shipment of goods is reported to the central transaction node 110 and such a shipment event is stored in the database 112, the information can be used to update the status of the event as "complete." If the shipment has been carried out but information regarding a receipt event has not been received, the status of the transaction can thus be determined as the goods being in transit.

When the receiver 124 receives the shipment, transaction event information including the timing of the receipt of goods is sent to the central transaction node 110. The central transaction node 110 uses receiver-identifying information and the timing information to correlate the information to a particular transaction, much like the similar process discussed above in connection with the receipt of shipment initiation information from the shipper 120. The central transaction node 110 then processes the transaction event in accordance with business rules associated with the parties to the particular transaction. For instance, the processing may involve the calculation of the time elapsed between the shipment initiation event as sent by the shipper 120 and the receipt event as sent by the receiver 124.

In various implementations, the carrier 122 provides transaction event information to the central transaction node 110 in a manner similar to that effected by each of the shipper 120 and carrier 124 as discussed above. This information can be provided in addition to or as an alternative to the information provided by the shipper and carrier 120 and 124, accordingly. Furthermore, carrier identification information associated with the transaction to which the transaction events apply can be stored for long-term use in the database 112. The above-discussed approach to the monitoring of elapsed time for particular shipments can accordingly be parsed and used in evaluating the performance of the carrier 122, with a multitude of additional information such as mileage, percentages of on-time delivery and others being optionally processed and stored in the database 112.

Figure 2:
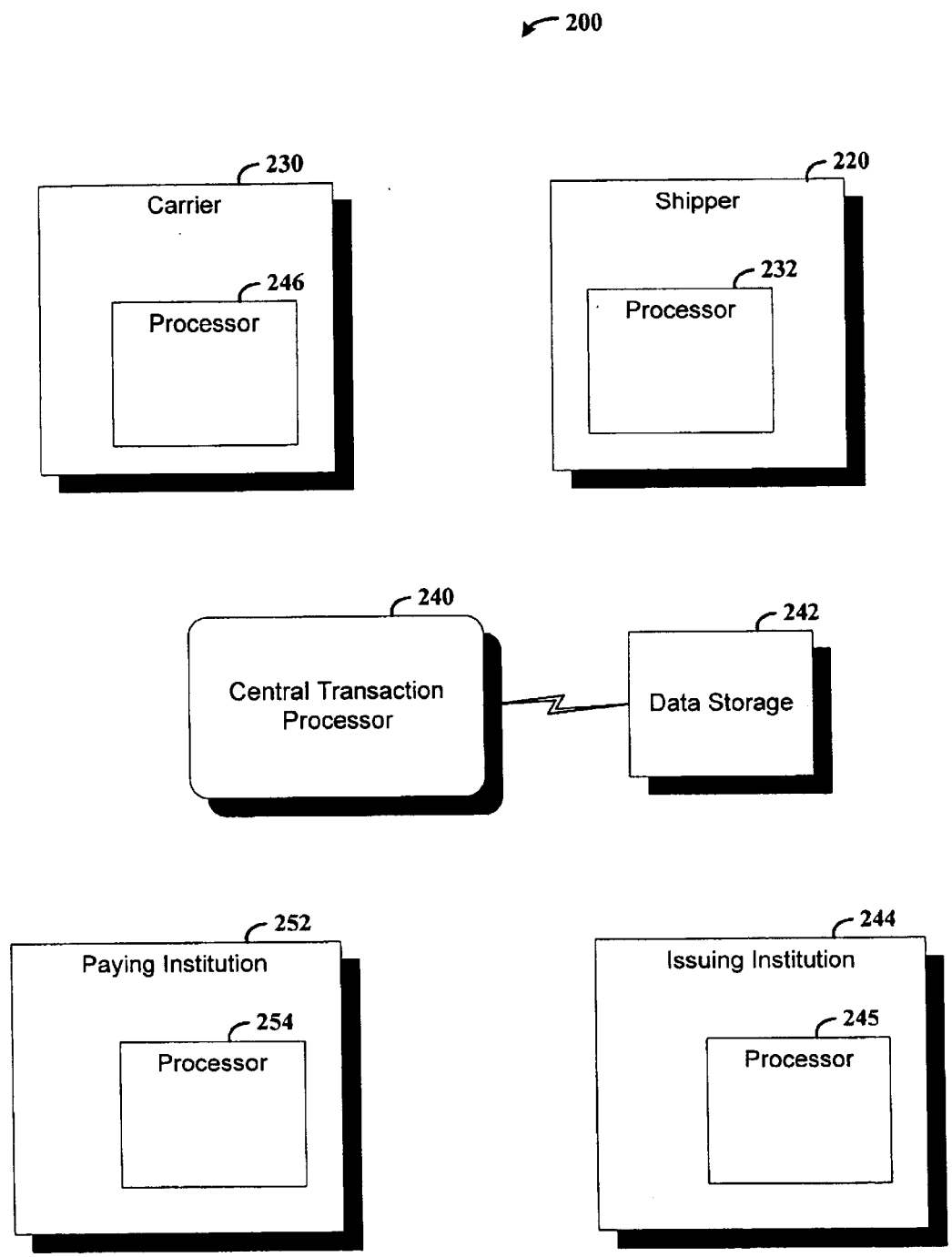
FIG. 2 is a block diagram showing an approach for processing and managing timing-related characteristics of a shipping transaction, according to another example embodiment of the present invention.

FIG. 2 shows a system 200 for shipping transaction processing, according to another example embodiment of the present invention. A shipper terminal 220 including a shipper processor 232 having a BOL rating engine initiates a shipment transaction to generate a rated BOL. The shipper terminal 220 may include, for example, a simple computer terminal and/or be representative of a network of terminals for a particular shipper entity. Transaction information including the rated BOL is sent to a central processor 240 that identifies and centrally tracks the transaction information. A carrier terminal 230 including a processor 246 receives proof of delivery information and sends this information to the central processor 240 along with a timing characteristic (e.g., time of the receipt of goods). The carrier terminal 230 may, for example, be a simple computer terminal and/or be representative of a network of terminals for a particular shipper entity, and in some instances, involves a mobile terminal that can be used by truckers and others performing the shipment. The central processor 240 processes and stores all pertinent shipment information including the timing characteristic in a data storage arrangement 242 and controls access to this information by the shipper 220, the carrier 222, and other authorized users.

The information stored at the data storage arrangement 242 is used in conjunction with the information received from both the shipper terminal 220 and the carrier terminal 230 to generate information used in auditing shipment transactions. The auditing may involve, for example, comparing actual timing characteristics with expected timing for shipment stored in connection with user profiles or other business rules. If the audit indicates a problem with timing, the central transaction processor 240 reacts accordingly, for example by notifying the shipper terminal 220 or by automatically adjusting a payment amount for the shipment as a function of business rules agreed upon by the shipper and carrier.

If the central processor 240 determines that a particular transaction is ripe for payment in response, for example, to transaction event data received from the shipper terminal 220 and carrier terminal 230, the central transaction processor initiates payment for the shipment. For example, where an issuing institution 244 and a paying institution 225 are involved, the central processor 240 interfaces respectively with processors 245 and 254 at these institutions for processing the payment. The issuing institution 244 maintains a credit account for the shipper at shipper terminal 220 and debits the shipper's account for the cost of the shipment. The paying institution 252 tenders payment to the carrier at carrier terminal 230.

Figure 3:
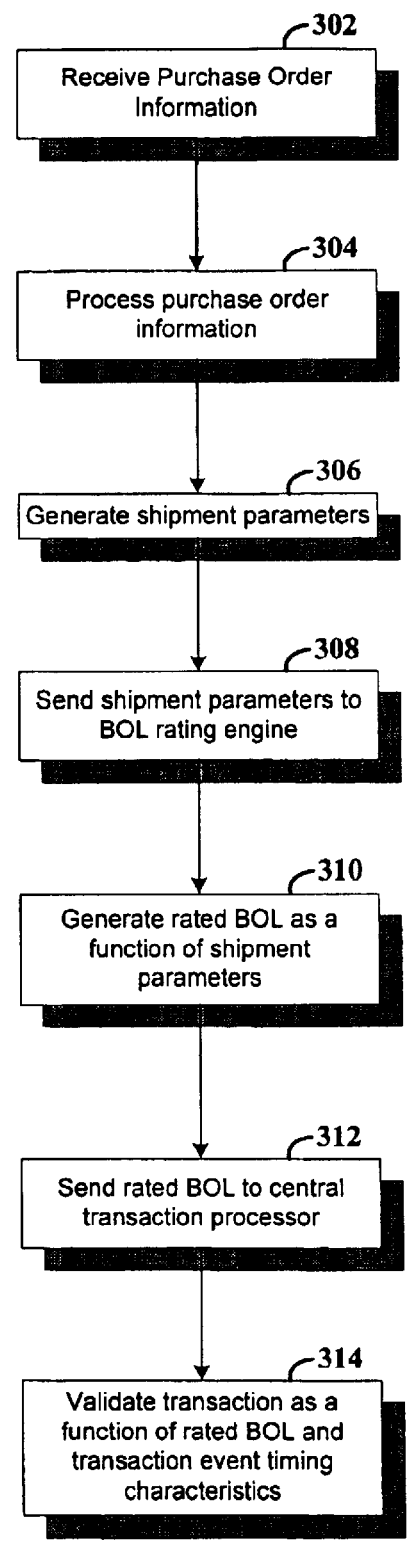
FIG. 3 is an example flowchart for tracking and processing timing-related characteristics of a shipping transaction in connection with FIG. 2, according to another example embodiment of the present invention.

FIG. 3 is a flow diagram illustrating an example approach for processing transaction information, according to another example embodiment of the present invention. The approach shown may, for example, be used in connection with the system 200 shown in FIG. 2. Purchase order information is received for storage and processing at block 302. At block 304, the purchase order information is processed in a manner that includes referencing inventory control and customer information systems, with shipment parameters being generated at block 306. In one particular application, the shipment parameters generated at block 306 include the identity of the carrier, identity of the receiver, the number of units, the weight of the shipment, the destination of the shipment, the date of shipment, and the estimated date of delivery. At block 308, the shipment parameters are sent to a BOL rating engine (e.g., at the shipper processor 232 of FIG. 2). A rated BOL is generated at block 310, with the BOL rating engine being programmed, for example, to an agreed upon rate structure by the shipper and carrier parties to the transaction. At block 312, the rated BOL is sent to a central processor (e.g., central processor 240 of FIG. 2) where a transaction to which the rated BOL applies is validated as a function of the rated BOL and transaction event timing characteristics.

Figure 4:
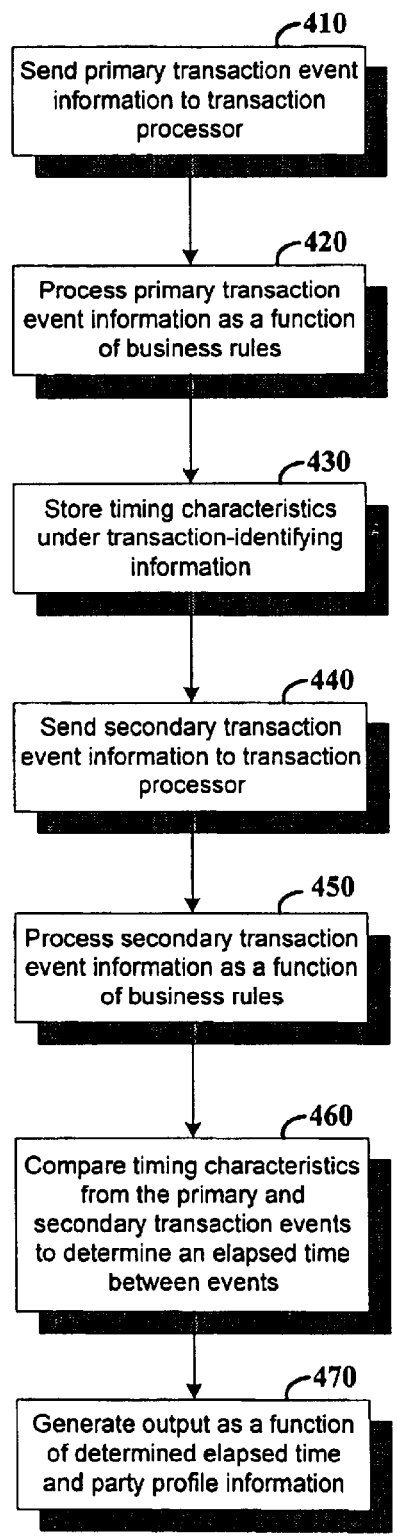
FIG. 4 is another example flowchart for tracking and processing timing-related characteristics of a transaction, according to another example embodiment of the present invention.

FIG. 4 shows a flow diagram for an approach to auditing transactions involving the processing of timing characteristics for transaction events, according to another example embodiment of the present invention. At block 410, transaction event information including timing characteristics for a transaction are sent to a transaction processor, which processes the transaction event information in accordance with business rules associated with a party to the transaction at block 420. The business rules may be defined, for example, as a function of profile characteristics stored for a party identified by the transaction event information. At block 430, timing characteristics received at block 420 are stored in a database accessible to the transaction processor. At block 440, secondary transaction event information is sent to the transaction processor, which processes the information at block 450 in accordance with business rules for a party identified by the transaction event information, similar to that discussed in connection with block 420. In some instances, the business rules used to process the primary and secondary transaction information are similar or even identical, for example where the transaction event information designates the same party to the transaction for both the primary and secondary transaction events. In other instances the business rules are different, for example where a primary party (e.g., a shipper) sends the primary transaction event information (e.g., initiation of shipment) and where the secondary party (e.g., receiver) sends the secondary transaction event information (e.g., receipt of goods).

Timing characteristics from the primary and secondary transaction events are compared at block 460 by the transaction processor and used to determine an elapsed time between the transaction events. An output is generated as a function of the elapsed time and party profile information at block 470. The transaction processor is thus programmed accordingly to use at least timing-related characteristics from each transaction event to calculate the elapsed time and provide the output.

In one implementation, the approach shown in FIG. 4 is used for tracking the time elapsed in connection with reconciliation of a dispute between parties to a transaction and corresponding payment for goods/services associated with the transaction. For instance, where the primary transaction event is a reconciliation event and the secondary transaction event is a payment receipt event, these events can be tracked using this approach. In another instance, the primary transaction event is the onset of a reconciliation process and the secondary transaction event is the completion of the reconciliation process, with elapsed time being tracked to provide an indication of the time for reconciliation. Still another instance involves the tracking of elapsed time between a primary reconciliation initiation event and a secondary payment event. In this regard, the comparison at block 460 and output generated at block 470 can be used to track the efficiency of a reconciliation process, which can be important for evaluating cash flow characteristics of business operations. Disputes applicable to this approach include, for example, a dispute in price, delivery or other transaction-related timing characteristic and quality of goods. For general information regarding business transactions and for specific information regarding reconciliation approaches for transaction disputes, reference may be made to U.S. patent application Ser. No. 10/436,878, entitled "Automated Transaction Processing System and Approach," filed on May 12, 2003 and which is fully incorporated herein by reference.

Figure 5:
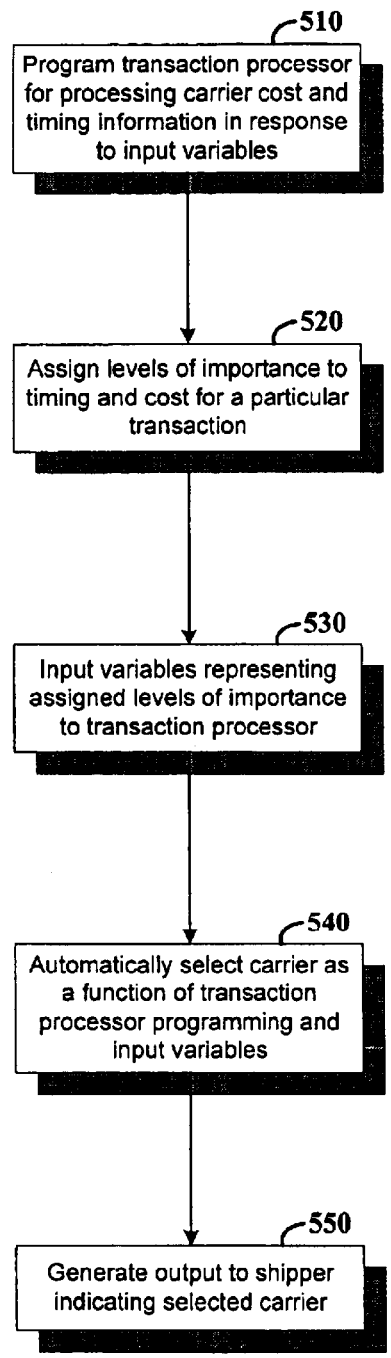
FIG. 5 is a flow diagram for automatically selecting a carrier as a function of business rules and timing characteristics for transactions associated with the carrier, according to another example embodiment of the present invention.

FIG. 5 shows a flow diagram for automatically selecting a carrier as a function of user profile information and timing-related transaction event history, according to another example embodiment of the present invention. Referring to FIG. 1 as an example, the central transaction node 110 can be programmed to provide a shipper with a suggested carrier based on characteristics input by the shipper for making the suggestion. A transaction processor (e.g., central transaction node 110) is programmed for processing costs and time performance for carriers in response to input variables. This programming may involve, for example, the use of an algorithm employing variables that relate to importance levels for timing and cost parameters. At block 520, a shipper assigns levels of importance to timing and cost for a particular transaction to be used by the transaction processor. The variables are input to the transaction processor at block 530 and are used at block 540 in connection with timing and cost characteristics for potential carriers to automatically select a carrier for the shipper to use with the particular transaction. These timing and cost characteristics may, for example, vary as a function of shipment and delivery locations and as such the transaction processor can be programmed to take these location-specific characteristics into account when automatically selecting a carrier. An output to the shipper indicating the selected carrier is generated at block 550 (and, in some instances, automatically used to offer and/or establish a shipping contract between the shipper and carrier). If timing for the shipment is relatively unimportant, low cost is factored as more important. If timing for the shipment is relatively important, high cost is factored as less important. Similar characteristics for other considerations, such as the type of carrier preferred by the shipper (e.g., where a shipper generally prefers a particular carrier for other business reasons) and others can also be programmed into the transaction processor and used in making the automatic selection of a carrier.

In another example embodiment of the present invention, a computer arrangement (e.g., at central transaction node 110 of FIG. 1) includes a computer communicatively coupled via the Internet to provide around-the-clock access to shipment transaction data including timing data to authorized transaction parties and system operators. In more specific implementations, authorized access is provided to a financial institution and/or an auditor that is independent of the transaction parties and system operators. Electronic notes can be included for supplemental communication with anyone in the shipment transaction chain. The computer maintains a database (e.g., using database 112 of FIG. 1) of information relating to the transactions for the parties that is used to analyze the transactions such as shipments for auditing, payment, processing changes (e.g., changes to business rules), and to facilitate resolution of audit discrepancies. For instance, when an audit approach includes a timing characteristic of transaction, the timing data is used by the computer to make a determination as to whether the transaction meets certain timing criteria set, for instance, by one of the parties to the transaction with business rules. Such an approach may be useful, for example, where a shipper contracts with a carrier to deliver goods within a certain time period; if that time period is not met, modifications to the transaction may be made such as by reducing the cost of the shipment as discussed above.

When a problem that affects timing arises with a shipment, for example, a shipper (or the carrier if preferred) can change BOL ratings via the Internet. In addition, notification of such a problem can be effected via the Internet in a generally real-time environment, for example by initiating an email or a pop-up window at a party's access terminal (computer coupled to the Internet). Moreover, a shipper can delay payment via the Internet, for example when a dispute exists or a carrier fails to perform according to contract such as by failing to meet a delivery requirement. Similarly, a carrier can inform the computer that a delivery is being selectively delayed due to problems in receiving payment from the shipper or other paying party.

By permitting transaction parties to access the database via a medium such as the Internet, the parties to the transaction can retrieve data useful in assisting the party address issues, internal and external, that relate to a particular transaction or a multitude of transactions. For instance, a shipper can access information indicative of carriers that have satisfactory on-time delivery records and of carriers that demonstrate cost-effective service between two locations. This approach is particularly useful where different carriers exhibit different delivery speed and cost characteristics for delivery between different locations, as is common. Carriers. can also use such data for purposes such as to identify shippers that generate business in a particular target region. Further, all users of the system have the potential to access an abundance of historical data including, for example, approval history, delivery and payment information.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A transaction auditing system for a business transaction involving at least two remotely-situated parties, the system comprising:

a data storage arrangement adapted to store user profile information including party-identifying information for parties to a business transaction, to store aspects of business transactions, the aspects including specified events that would occur at different times and to provide information indicative of a status of the transaction; and a central processing arrangement coupled to the data storage arrangement and adapted to:

receive event data for one of the specified events from one of the remotely-situated parties, the event data having a timing-related characteristic and information for associating the specified event with a common business transaction;

receive event data for another one of the specified events from another one of the remotely-situated parties, the event data having a timing-related characteristic and information for associating the specified event with a common business transaction;

automatically associate the received event data for the specified events with a particular common business transaction and with at least one of the parties as a function of the confirmation data and the user profile information; and determine an elapsed time between the specified events as a function of the received confirmation data and automatically audit the particular common transaction as a function of the elapsed time.

2. The system of claim 1, wherein the event data includes party-identifying information that identifies at least one party involved in the event and wherein the central processing arrangement is adapted to automatically associate the received event data with the at least one party as a function of the party-identifying information.

3. The system of claim 2, wherein the data storage arrangement is adapted to store user profile information including auditing process information and wherein the central processing arrangement is adapted to automatically audit the particular common transaction using the elapsed time and auditing information in the user profile for the at least one party automatically associated with the event data.

4. The system of claim 3, wherein the data storage arrangement is adapted to store different auditing process information for different parties and further to audit the particular common transaction using a first auditing process for a first party and, in a separate audit, audit the particular common transaction using a second auditing process for a second party.

5. The system of claim 4, wherein the data storage arrangement is adapted to store auditing process information including instructions for comparing timing characteristics for specific events and wherein the central processing arrangement is adapted to compare the timing characteristics using the instructions for comparing timing characteristics.

6. The system of claim 5, wherein the central processing arrangement is adapted to receive event data including data for the initiation of a shipping event for shipping goods and data for delivery of the goods and to automatically determine an elapsed time between the shipment and delivery of the goods.

7. The system of claim 6, wherein the central processing arrangement is adapted to audit the transaction involving the shipment of the goods to determine whether the elapsed time is within an predefined limit and, in the event that the shipment falls within the predefined limit, to authorize payment for the transaction and, in the event that the shipment falls outside of the predefined limit, withhold authorization for payment for the transaction and flag the transaction for evaluation.

8. The system of claim 3, wherein the data storage arrangement is adapted to store user profile information including auditing process information for different types of specific events and wherein the central processing arrangement is adapted to automatically audit the particular common transaction using the elapsed time and auditing information for the specific type of event for which event data is received.

9. The system of claim 1, wherein the central processing arrangement is adapted to audit the particular common transaction to determine whether the elapsed time is within an predefined limit and, in the event that the elapsed time falls within the predefined limit, to authorize payment for the transaction and, in the event that the elapsed time falls outside of the predefined limit, withhold authorization for payment for the transaction and flag the transaction for evaluation.

10. The system of claim 1, wherein the central transaction arrangement is adapted to receive event data for a reconciliation process and to track timing between events in the reconciliation process as a function of the elapsed time.

11. The system of claim 10, wherein the central transaction arrangement is further adapted to:
in response to an audit of the particular common transaction determine that the elapsed time falls outside of a range specified by one of the parties to the transaction;
initiate a reconciliation process; and
track time between the initiation of the reconciliation process and another reconciliation event.

12. The system of claim 11, wherein the central transaction arrangement is adapted to track time between the completion of the reconciliation process and payment for the transaction.

13. The system of claim 12, wherein the central transaction arrangement is adapted to track time between the initiation of the reconciliation process and payment for the transaction.

14. The system of claim 1, wherein the central processing arrangement is adapted to receive event data for a multitude of shipping transactions and to determine an elapsed time between shipment and delivery events for particular ones of the shipping transactions.

15. The system of claim 14, wherein the data storage arrangement is adapted to store user profile information for carriers and wherein the central transaction arrangement is adapted to associate the particular ones of the shipping transactions with particular carriers.

16. The system of claim 15, wherein the central transaction arrangement is further adapted to store historical elapsed time data for particular carriers and to permit access to the stored historical elapsed time data to a party as a function of user profile information for the party.

17. The system of claim 15, wherein the central transaction arrangement is further adapted to store event data including cost data for shipping transactions for the particular carriers and to permit access to the stored cost data to a party as a function of user profile information for the party.

18. The system of claim 15, wherein the central transaction arrangement is further adapted to store historical elapsed time data and event data including cost data for particular carriers and to automatically select a carrier as a function of timing and cost characteristics for a particular proposed shipment transaction.

* * * * *

UNITED STATES PATENT AND TRADEMARK OFFICE
CERTIFICATE OF CORRECTION

PATENT NO. : 7,110,959 B2  Page 1 of 1
APPLICATION NO. : 10/729350
DATED : September 19, 2006
INVENTOR(S) : Hahn-Carlson It is certified that error appears in the above-identified patent and that said Letters Patent is hereby corrected as shown below:

In the Claims

Column 15: lines 12, 15 each occurrence: "confirmation data" should read -- event data --.
Column 16: lines 14, 18, 27-28, 31-32, 42, 45-46, 50-51, 55-56, each occurrence:
  "central transaction arrangement" should read -- central processing arrangement --.

Signed and Sealed this

Tenth Day of April, 2007

JON W. DUDAS
*Director of the United States Patent and Trademark Office*